(12) United States Patent
Reshidko et al.

(10) Patent No.: US 10,394,034 B2
(45) Date of Patent: Aug. 27, 2019

(54) EYE-TRACKING WITH MEMS SCANNING AND OPTICAL RELAY

(71) Applicant: Microsoft Technology Licensing, LLC, Redmond, WA (US)

(72) Inventors: Dmitry Reshidko, Redmond, WA (US); Ian Anh Nguyen, Renton, WA (US); Richard Andrew Wall, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

(21) Appl. No.: 15/677,999

(22) Filed: Aug. 15, 2017

(65) Prior Publication Data

US 2019/0056599 A1   Feb. 21, 2019

(51) Int. Cl.
   *G02B 27/01* (2006.01)
   *G06K 9/00* (2006.01)
   (Continued)

(52) U.S. Cl.
   CPC ........... *G02B 27/0179* (2013.01); *G02B 5/04* (2013.01); *G02B 26/0833* (2013.01);
   (Continued)

(58) Field of Classification Search
   CPC ............ G02B 27/0179; G02B 26/0833; G02B 26/10; G02B 27/0172; G02B 27/126;
   (Continued)

(56) References Cited

U.S. PATENT DOCUMENTS 7,284,862 B1   10/2007   Lai et al.
7,401,920 B1   7/2008   Kranz et al.
(Continued)

FOREIGN PATENT DOCUMENTS

WO   9815868 A1   4/1998
WO   2001009685 A1   2/2001
(Continued)

OTHER PUBLICATIONS

Cideciyan, et al., "Developing an Outcome Measure with High Luminance for Optogenetics Treatment of Severe Retinal Degenerations and for Gene Therapy of Cone Diseases", in Journal of Investigative Ophthalmology & Visual Science, vol. 57, Issue 7, Jun. 2016, pp. 3211-3221.
(Continued)

*Primary Examiner* — Dmitriy Bolotin
(74) *Attorney, Agent, or Firm* — Alleman Hall Creasman & Tuttle LLP

(57) ABSTRACT

An eye-tracking system is provided that includes a light source configured to emit at least infrared (IR) light and a microelectromechanical system (MEMS) scanning mirror configured to direct the IR light. The system further includes a relay including at least one prism, and the relay is configured to receive the IR light directed by the MEMS scanning mirror and redirect the IR light. The system further includes a waveguide through which the IR light redirected by the relay passes to reach an eye, and at least one sensor configured to receive the IR light after being reflected by the eye.

19 Claims, 9 Drawing Sheets

(51) Int. Cl.
*G06F 3/01* (2006.01)
*G02B 26/08* (2006.01)
*G02B 26/10* (2006.01)
*G02B 27/12* (2006.01)
*G02B 5/04* (2006.01)
*G02B 27/00* (2006.01)

(52) U.S. Cl.
CPC ......... *G02B 26/10* (2013.01); *G02B 27/0093* (2013.01); *G02B 27/0172* (2013.01); *G02B 27/126* (2013.01); *G06F 3/013* (2013.01); *G06K 9/00604* (2013.01); *G06K 9/00617* (2013.01); *G02B 2027/014* (2013.01); *G02B 2027/0187* (2013.01); *G05B 2219/35503* (2013.01)

(58) Field of Classification Search
CPC .............. G02B 2027/0187; G02B 5/04; G02B 27/0093; G02B 2027/014; G06F 3/013; G06K 9/00604; G06K 9/00617; G05B 2219/35503
See application file for complete search history.

(56) References Cited

U.S. PATENT DOCUMENTS

| | | | | |
|---|---|---|---|---|
| 8,403,490 | B2* | 3/2013 | Sugiyama | G02B 27/0172 345/8 |
| 8,956,396 | B1* | 2/2015 | Friend | A61N 5/0622 607/88 |
| 9,345,402 | B2* | 5/2016 | Gao | A61B 3/113 |
| 9,494,799 | B2 | 11/2016 | Robbins et al. | |
| 9,880,441 | B1* | 1/2018 | Osterhout | G02F 1/153 |
| 2011/0109880 | A1* | 5/2011 | Nummela | A61B 3/113 351/210 |
| 2011/0116169 | A1 | 5/2011 | Hudman | |
| 2012/0206485 | A1* | 8/2012 | Osterhout | G02B 27/0093 345/633 |
| 2012/0249797 | A1* | 10/2012 | Haddick | G06F 1/163 348/158 |
| 2012/0257166 | A1* | 10/2012 | Francis | G02B 21/0028 351/208 |
| 2013/0077049 | A1* | 3/2013 | Bohn | G02B 5/20 351/210 |
| 2013/0106674 | A1* | 5/2013 | Wheeler | G02B 27/017 345/8 |
| 2013/0128364 | A1* | 5/2013 | Wheeler | A61B 3/113 359/630 |
| 2013/0194548 | A1* | 8/2013 | Francis | A61B 3/1025 351/208 |
| 2014/0306878 | A1 | 10/2014 | Bhakta | |
| 2014/0361957 | A1* | 12/2014 | Hua | G06F 3/013 345/8 |
| 2015/0185475 | A1* | 7/2015 | Saarikko | G02B 6/02085 382/117 |
| 2016/0077338 | A1* | 3/2016 | Robbins | G02B 27/0172 345/8 |
| 2016/0109709 | A1* | 4/2016 | Osterhout | G06F 3/03545 359/614 |
| 2016/0195721 | A1* | 7/2016 | Evans | G02B 27/0172 345/8 |
| 2017/0068091 | A1 | 3/2017 | Greenberg | |
| 2017/0176818 | A1* | 6/2017 | Shi | G02F 1/134309 |
| 2018/0046859 | A1* | 2/2018 | Jarvenpaa | G02B 27/0172 |
| 2018/0074318 | A1* | 3/2018 | Wheelwright | G02B 27/0172 |

FOREIGN PATENT DOCUMENTS

| | | |
|---|---|---|
| WO | 2013049012 A1 | 4/2013 |
| WO | 2016191709 A1 | 12/2016 |
| WO | 2017060665 A1 | 4/2017 |

OTHER PUBLICATIONS

"International Search Report and Written Opinion Issued in PCT Application No. PCT/US2018/038676", dated Sep. 19, 2018, 11 Pages.

* cited by examiner

EYE-TRACKING WITH MEMS SCANNING AND OPTICAL RELAY

BACKGROUND

In a wearable device such as a head-mounted display (HMD) device, estimating the position of a user's eye can allow the HMD device to display images according to where the user's eye is located and in which direction the user is looking. The user may also interact with the HMD device by using their gaze as input to command the HMD device. In order to determine the position and gaze of the user's eye, an eye-tracking system is sometimes added to the HMD device. In addition, the eye-tracking system may capture an iris image of the user eye to enable user authentication by image analysis of the iris. However, such systems can add weight, use processing power, obscure the user's field of view, or shine too much light near the user's eyes.

SUMMARY

To address the issues discussed above, an eye-tracking system is provided that includes a light source configured to emit at least infrared (IR) light and a microelectromechanical system (MEMS) scanning mirror configured to direct the IR light. The system may further include a relay including at least one prism, and the relay is configured to receive the IR light directed by the MEMS scanning mirror and redirect the IR light. The system may further include at least one sensor configured to receive the IR light after being reflected by the eye.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors have recognized that conventional eye-tracking systems are too large because they direct light from multiple bright light-emitting diodes (LEDs) to the user's eye, sometimes via large optical components such as imaging lenses and mirrors, and capture images of the user's eye with bulky cameras of the size used in cellular phones. The LEDs typically introduce undesirable stray light into the display area. Furthermore, these eye-tracking systems are typically added onto an existing display system, impacting the overall design, cost, and ergonomic feel of the HMD device. The systems and methods described herein have been devised to address these challenges, and, as discussed below, offer the advantage of potentially allowing for a more compact and unobtrusive design.

Figure 1:
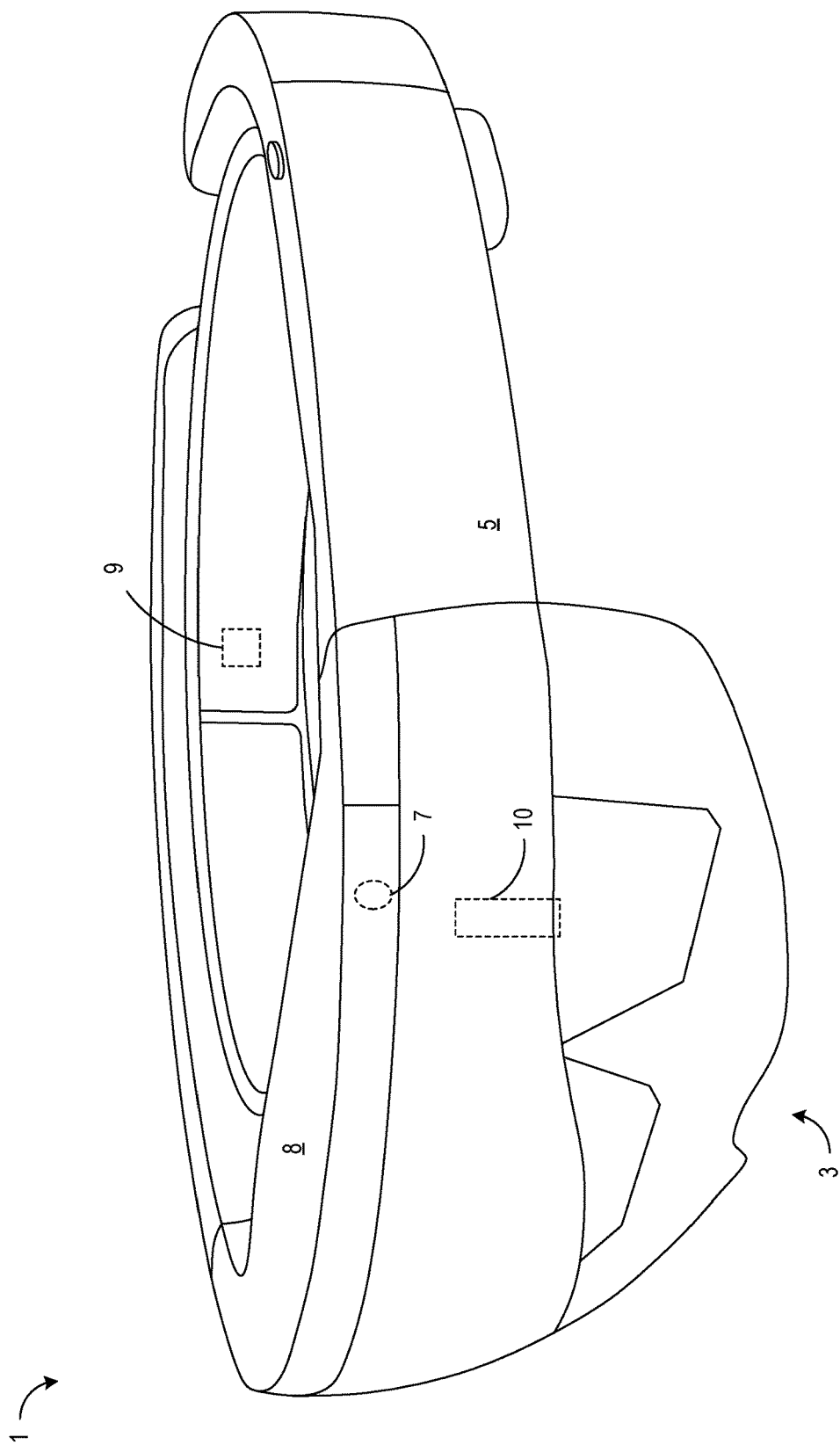
FIG. 1 shows a side perspective view of a head mounted display (HMD) device with an eye-tracking system.

FIG. 1 shows a side perspective view of a head mounted display (HMD) device 1 with an eye-tracking system. In the example of FIG. 1, the HMD device 1 includes a display device 3 and a frame 5 that wraps around the head of a user to position the display device 3 close to the user's eyes when providing a virtual reality or mixed reality experience to the user. Any suitable display technology and configuration may be used to display images via the display device 3. For a virtual reality experience, the display device 3 may be a non-see-through Light-Emitting Diode (LED) display, a Liquid Crystal Display (LCD), or any other suitable type of opaque display. In some cases, outwardly facing cameras 7 may be provided that capture images of the surrounding environment, and these captured images may be displayed on the display along with computer generated images that augment the captured images of the real environment. For a mixed or augmented reality experience, the display device 3 may be at least partially transparent so that the user of the HMD device 1 may view a physical, real-world object in the physical environment through one or more partially transparent pixels displaying virtual object representations. For example, the display device 3 may include image-producing elements such as, for example, a see-through Organic Light-Emitting Diode (OLED) display.

The frame 5 may further support additional components of the HMD device 1, including a processor 8, an inertial measurement unit (IMU) 9, and an eye-tracking system 10. The processor 8 may include logic and associated computer memory configured to receive sensory signals from the IMU 9 and other sensors, to provide display signals to the display device 3, to derive information from collected data, and to enact various control processes described herein.

Figure 2A:
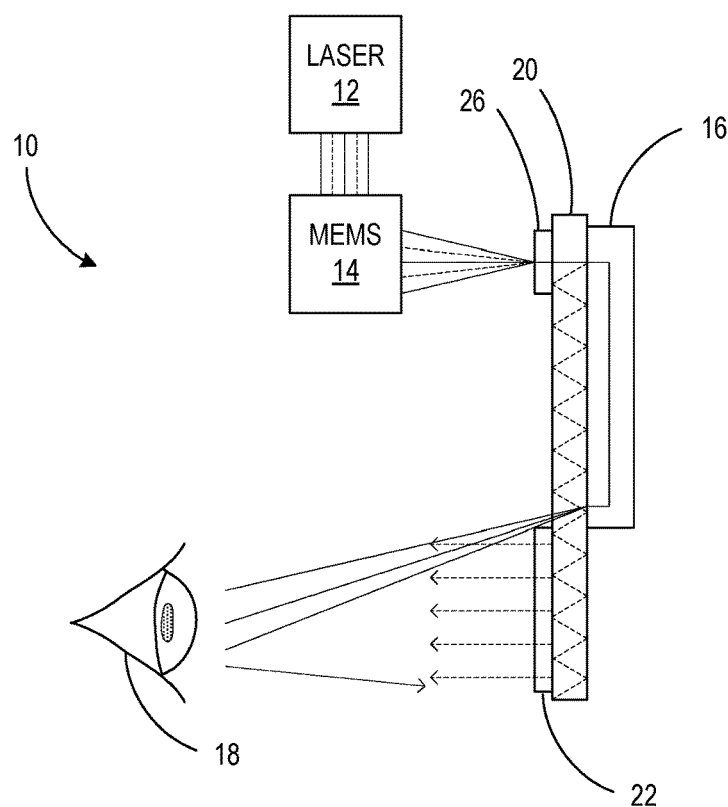
FIG. 2A is a side view of a simplified illustration of the eye-tracking system of FIG. 1.
Figure 2B:
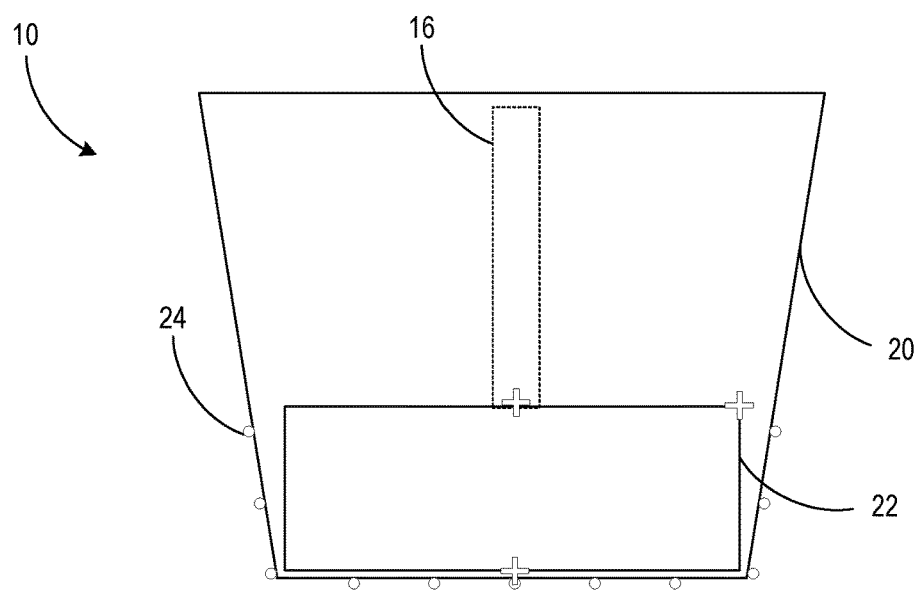
FIG. 2B is a front view of the eye-tracking system of FIG. 2A.

FIG. 2A is a side view of a simplified illustration of the eye-tracking system 10, and FIG. 2B is a front view. As discussed above, the eye-tracking system 10 may be included in a HMD device. Images may be displayed differently according to where the user is currently looking, or according to the distance behind the display device 3 that the user's eyes are currently located, as minor shifting can occur while wearing the HMD device 1 and different users have different shapes to their faces. Accordingly, the position of the user's eye(s) may be tracked by the eye-tracking system 10. As shown in FIG. 2A, the eye-tracking system 10 may include a light source such as a laser module 12 configured to emit at least infrared (IR) light, illustrated here in a simplified manner with solid lines. Alternative light sources may include one or more light-emitting diodes (LEDs), diode lasers, and/or fiber lasers, to provide merely a few examples. The IR light may be so-called near-infrared (NIR) light. For example, the NIR light used may have a wavelength of approximately 800 nm to 1 µm, although it will be appreciated that other wavelengths may be suitable. The laser module 12 may include one laser, or may include several lasers (e.g., IR, red, blue, and green) that are collimated, shaped, and combined into a single beam. Further, the laser module 12 may emit only IR light, or may be configured to also emit other frequencies. For example, the laser module 12 may be further configured to emit visible light, as discussed below.

Next, the eye-tracking system 10 may include a microelectromechanical system (MEMS) scanning mirror 14 configured to direct the IR light from the laser module 12. When the laser module 12 emits visible light, the MEMS scanning mirror 14 may be further configured to direct the visible light as well. The MEMS scanning mirror may include only a single micro-mirror, or may be a mirror array that includes a plurality of micro-mirrors. As a MEMS device, the scanning mirror 14 may be approximately 1 mm to 3 mm in order to display visible light, or less than 1 mm if only IR light is steered. The MEMS scanning mirror 14 may be configured to form an image at an infinite viewing distance, resulting in a point-like collimated beam of the IR light. The MEMS scanning mirror 14 may include a microprocessor and stored instructions to move the micro-mirror(s), thus directing the beam of light from the laser module 12. The MEMS scanning mirror 14 may be programmed to direct the beam in a predetermined pattern or in response to a command at known times so that an effect of the beam downstream may be compared to a known direction of the beam at a given time. While the laser module 12 and the MEMS scanning mirror 14 are schematically shown here as separate components, it will be appreciated that they may be suitably combined into a single component.

The eye-tracking system 10 may further include a relay 16 including at least one prism, details of which are explained below with reference to the implementations illustrated in FIGS. 3A-6B. Briefly, the relay 16 may be an optical relay configured to receive the IR light directed by the MEMS scanning mirror 14 and redirect and/or convey the IR light. In this example, the laser module 12 and MEMS scanning mirror 14 are located above the height of the user's eye 18 and the relay 16 is utilized to both lower the light beam closer to the height of the eye 18 and redirect the IR light back toward the eye 18 (to the left in FIG. 2A), when the MEMS scanning mirror 14 is directing the beam away from the eye 18 (to the right in FIG. 2A). The eye-tracking system 10 may include a plate such as waveguide 20 through which the IR light redirected by the relay 16 may pass to reach the eye 18 as illustrated. Alternatively, the relay 16 may be positioned on the near side of the waveguide 20 from the eye 18 (the left side in FIG. 2A) such that the IR light does not necessarily pass through the waveguide 20. The waveguide 20 may also be configured to propagate the visible light to be displayed by a diffractive optical element 22, as will be discussed below. However, when the HMD device 1 utilizes display technology that does not include a waveguide, a different corresponding type of plate may be used in the place of the waveguide 20.

As can be seen in FIG. 2B, the IR light may exit the relay 16 and waveguide 20 at a variety of points illustrated by a plus sign. The IR light may be directed to exit at an edge or corner of the diffractive optical element 22 in order to achieve a more direct angle toward the eye 18, while avoiding obscuring the user's field of view through the diffractive optical element 22. A more direct angle may increase accuracy of the eye-tracking system. In the illustrated case, a prism of the relay 16 may be positioned to direct the IR light obliquely toward the eye 18 through the waveguide 20. Finally, as shown in FIG. 2B, the eye-tracking system 10 may include at least one sensor 24 configured to receive the IR light after being reflected by the eye 18. In addition to specular reflected light, the sensor(s) 24 may also receive diffuse scattered light from the eye 18.

In some cases, the at least one sensor 24 may be a plurality of single-pixel photodiodes, each placed at a known, fixed position relative to the MEMS scanning mirror 14. The positions of the sensors 24 may be around a periphery of the transparent waveguide 20 so that the user's view is not obstructed. As the MEMS scanning mirror 14 steers the IR beam across the user's eye 18, the specular reflections and diffuse scatters from the eye 18 are recorded by the sensor(s) 24 as a function of beam direction or mirror scan angle. It will be appreciated that a small cluster of pixels rather than a single pixel may be used to provide sufficient precision instead. Accordingly, the known angular positions of the one or more mirrors of the MEMS scanning mirror 14 at the corresponding recorded times can be used to determine the position and gaze direction of the eye 18 based on which sensor 24 senses the reflected IR light. The sensors 24 may be connected to the microprocessor of the MEMS scanning mirror 14 and/or the processor 8 for the microprocessor or processor 8 to receive the sensor data and calculate the eye position and gaze direction.

In addition, the sensor data can also be used to reconstruct an image of the user's iris by, for example, the processor 8. Such a reconstructed image may be used in a user authentication procedure where a current user's iris is compared to a stored image of an authenticated user in order to grant or deny access. Thus, the eye-tracking system 10 may perform multiple functions typically associated with bulkier, heavier equipment such as a large camera that may be omitted entirely from the HMD device 1.

The HMD device 1 may include the eye-tracking system 10 and a display illumination system of the display device 3 that are formed separately. Alternatively, the eye-tracking system 10 and the display illumination system may share some common components. A visible light path of the display illumination system when the eye-tracking system 10 is integrated is shown in dashed lines in FIG. 2A. Thus, one example of an HMD device 1 with an eye-tracking system 10 may include a laser module 12 configured to emit visible and IR light, and a MEMS scanning mirror 14 configured to direct the visible and IR light. Here, the visible and IR light paths may diverge from one another. The HMD device 1 may include a relay 16 including at least one prism, the relay configured to receive the IR light directed by the MEMS scanning mirror 14 and redirect the IR light, and a waveguide 20 through which the IR light redirected by the relay 16 passes to reach an eye 18, and within which the visible light directed by the MEMS scanning mirror 14 propagates. In order to enter the waveguide 20, the visible light may pass through an incoupling element 26 such as a grating. However, the incoupling element 26 and/or waveguide 20 may be adjusted so that only the visible light is trapped by the waveguide 20 and propagated, while the IR light merely passes through to the relay 16 on the other side of the waveguide 20 from the MEMS scanning mirror 14. Finally, the HMD device 1 may include at least one sensor 24 configured to receive the IR light after being reflected by the eye 18, and a diffractive optical element 22 configured to display the visible light propagated by the waveguide 20. Thus, the visible light path and IR light path may share the laser module 12, the MEMS scanning mirror 14, and/or the waveguide 20. Accordingly, the eye-tracking system 10 may be more compact and less obtrusive than conventional implementations.

Figure 2C:
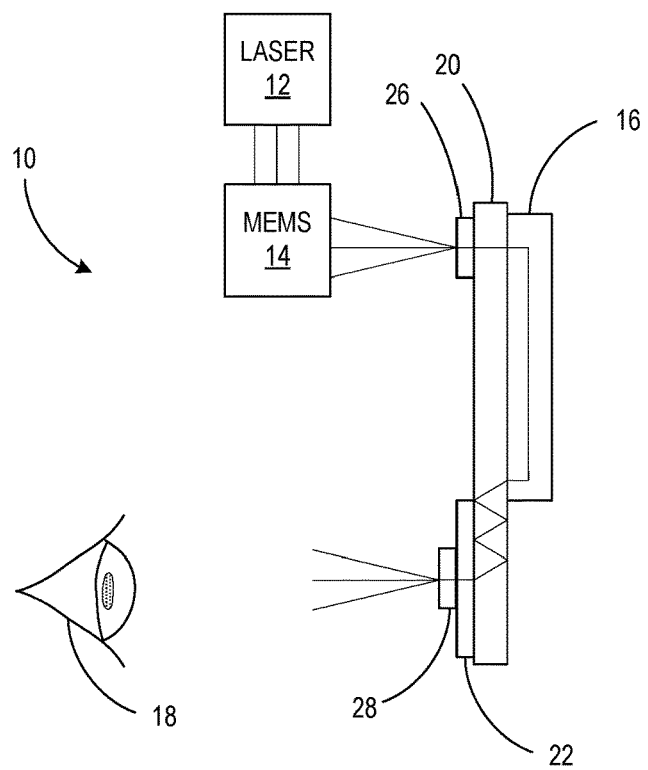
FIGS. 2C and 2D are side views of the eye-tracking system of FIG. 2A with alternative outcoupling arrangements.
Figure 2D:
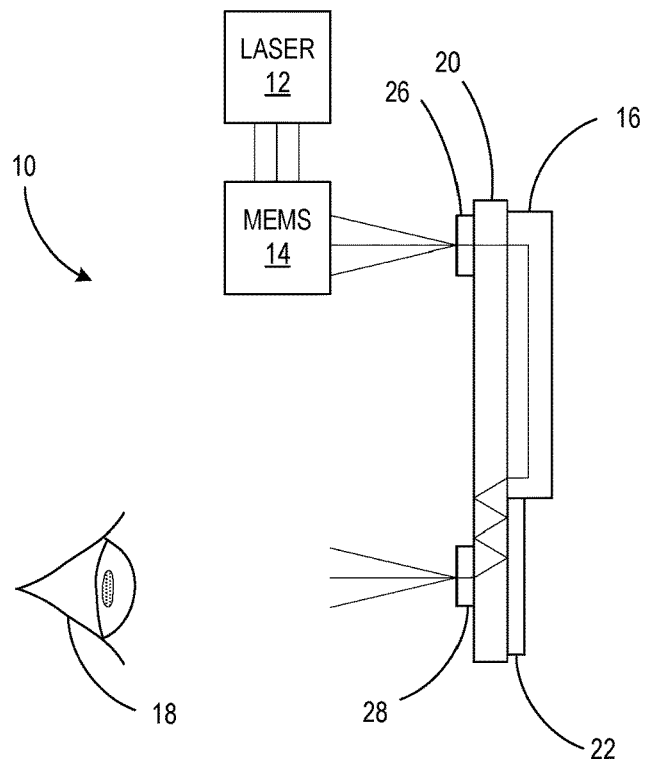

FIGS. 2C and 2D are side views of the eye-tracking system 10 with alternative outcoupling arrangements. While FIG. 2A shows the IR light exiting the relay by passing through the waveguide 20 to reach the eye 18 at an oblique angle, FIGS. 2C and 2D show the relay 16 coupled to the waveguide 20 such that the IR light instead follows an IR light path that exits the relay 16, enters the waveguide 20, propagates within the waveguide 20, and exits the waveguide 20 via an outcoupling element 28 such as a grating before reaching the eye 18. In this manner, the relay 16 may still be positioned out of view, but the angle of the IR light output toward the eye 18 may be more direct than that shown in FIG. 2A. The IR light may use the outcoupling element 28 to escape the waveguide 20 while the visible light (see FIG. 2A) may use the diffractive optical element 22 as an outcoupling element, each outcoupling element set to outcouple light based on wavelength. The incoupling/outcoupling elements on the waveguide 20 described herein may be components added to the waveguide 20, but they may also be printed or etched directly on the waveguide. In FIG. 2C, the outcoupling element 28 is arranged between the diffractive optical element 22 and the eye 18, and in FIG. 2D, the outcoupling element 28 is arranged on one side of the waveguide 20 while the diffractive optical element 22 is arranged on the other. These two configurations are exemplary, and other arrangements are possible.

Figure 3A:
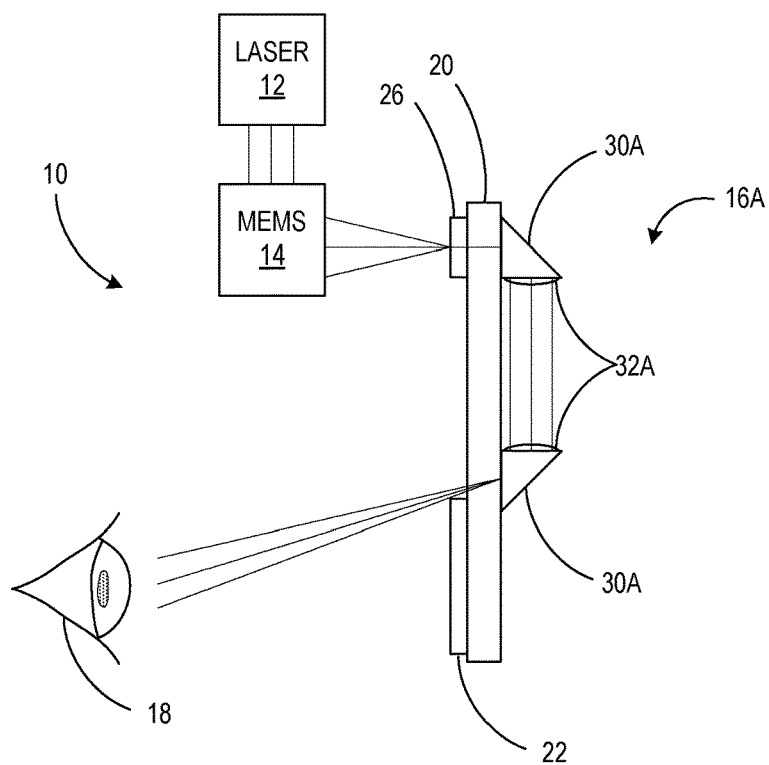
FIG. 3A is a side view of the eye-tracking system of FIG. 2A with a prism relay.
Figure 3B:
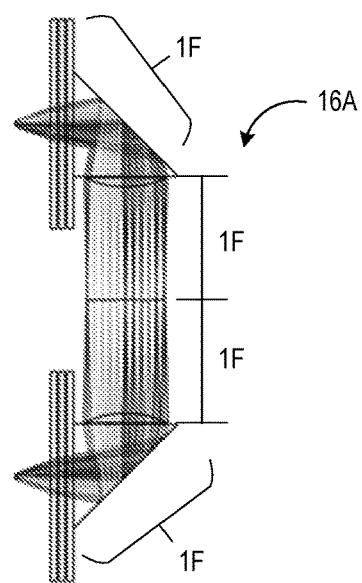
FIG. 3B is a simulation example of the prism relay of FIG. 3A.

A variety of implementations of the relay 16 may be suitable for the eye-tracking system 10. For example, FIG. 3A is a side view of the eye-tracking system 10 with a prism relay 16A, and FIG. 3B is a simulation example of the prism relay 16A. The relay 16A may include two prisms 30A connected to the waveguide 20, each prism 30A having a respective lens 32. The prisms 30A may be, for example, adhered to the waveguide 20. In this implementation as well as in each of the following implementations, the configuration of FIG. 2A in which the relay 16 passes IR light through the waveguide is illustrated, and thus one of the prisms 30A may be positioned to direct the IR light obliquely toward the eye 18 through the waveguide 20. However, it will be appreciated that the configuration of FIGS. 2C-D in which the IR light exiting the relay 16 enters the waveguide 20 to propagate may also be adopted. In such a case, the angle of the prism may be adjusted to couple the IR light into the waveguide 20 without using an incoupling element. In addition, each prism 30A may be configured to form a telecentric image.

As shown in FIG. 3B, the relay 16A may be a so-called "4F" system, where each segment of the IR light path as labeled in the drawing is one focal length F. The first segment is from the MEMS scanning mirror 14 to the exit of the first prism 30A, the second segment is from the exit of the first prism 30A to the midpoint between the prisms 30A, the third segment is from the midpoint to the entrance of the second prism 30A, and the fourth segment is from the entrance of the second prism 30A to the relayed image of the MEMS scanning mirror 14. Two identical prisms 30A may be used for 1:1 relay of the IR light, or two different prisms 30A with different focal lengths may be used for magnification. Magnification may be used to, for example, adjust a cone angle or beam size of the IR light. For instance, the cone angle of the beam from the MEMS scanning mirror 14 may be set according to the specifications of the display device 3 and may not be the desired cone angle output from the relay 16 in order to illuminate the eye box, and thus a different focal length of one of the prisms may then change the exit cone size appropriately. In addition, a large beam may provide greater illumination of the eye box, but a smaller beam may provide higher contrast for finer resolution. The different shades shown in the simulation example represent a different beam angle the MEMS scanning mirror 14 may change to at a given time.

Figure 4A:
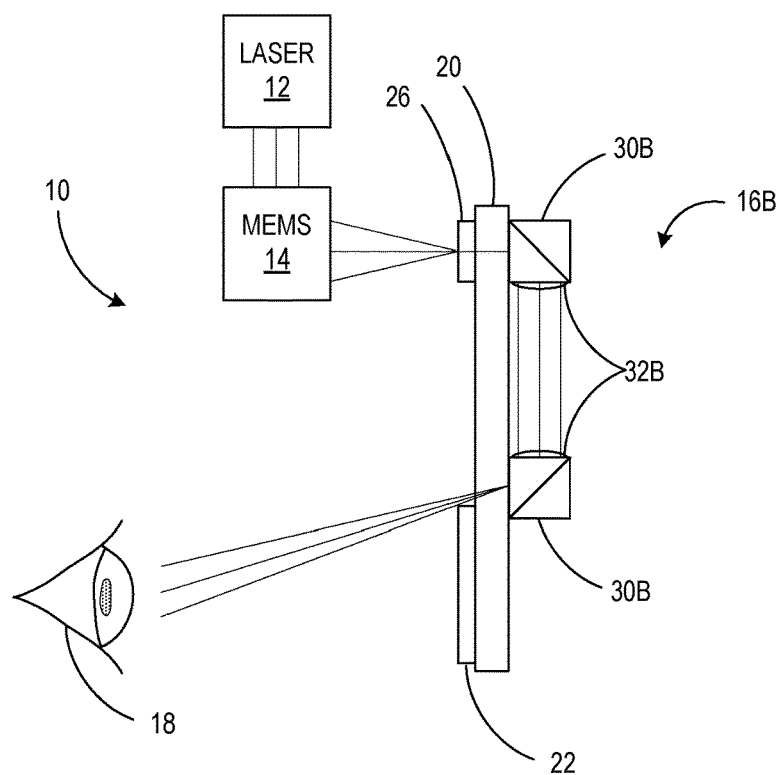
FIG. 4A is a side view of the eye-tracking system of FIG. 2A with a beam splitter relay.
Figure 4B:
FIGS. 4B and 4C are simulation examples of the beam splitter relay of FIG. 4A.
Figure 4C:
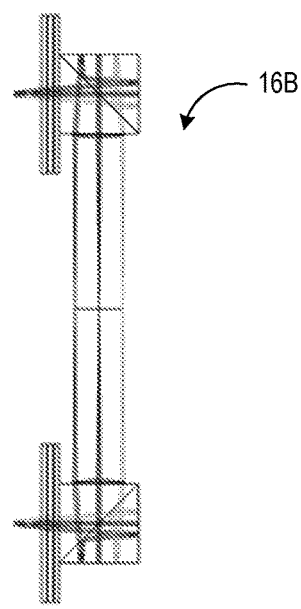

FIG. 4A is a side view of the eye-tracking system 10 with a beam splitter relay 16B, and FIGS. 4B and 4C are simulation examples of the beam splitter relay 16B. The relay 16B may include two prisms 30B that are beam splitters, and may be polarizing beam splitters. Like the prisms 30A of FIG. 3A, the beam splitters 30B each form a telecentric image, may have one or more lenses 32 attached to its surfaces, may be adhered to the waveguide 20, are illustrated in the simulations as forming 1:1 relay of the light, and can instead be adjusted to induce magnification. In addition, as can be seen by comparing the relay length of FIGS. 4B and 4C to FIG. 3B, the focal length is increased by including beam splitters 30B due to reflecting off the outer surface once (FIG. 4B) or twice (FIG. 4C), thus increasing the optical path length by multiple reflections inside the cube. As such, the length of the relay 16 is also increased. Depending on the orientation of the beam splitters 3011, as can be seen by comparing FIGS. 4B and 4C, the focal length and thus the relay length in a 4F system can be further increased. This increased length can increase flexibility in the placement of the relay output.

Figure 5A:
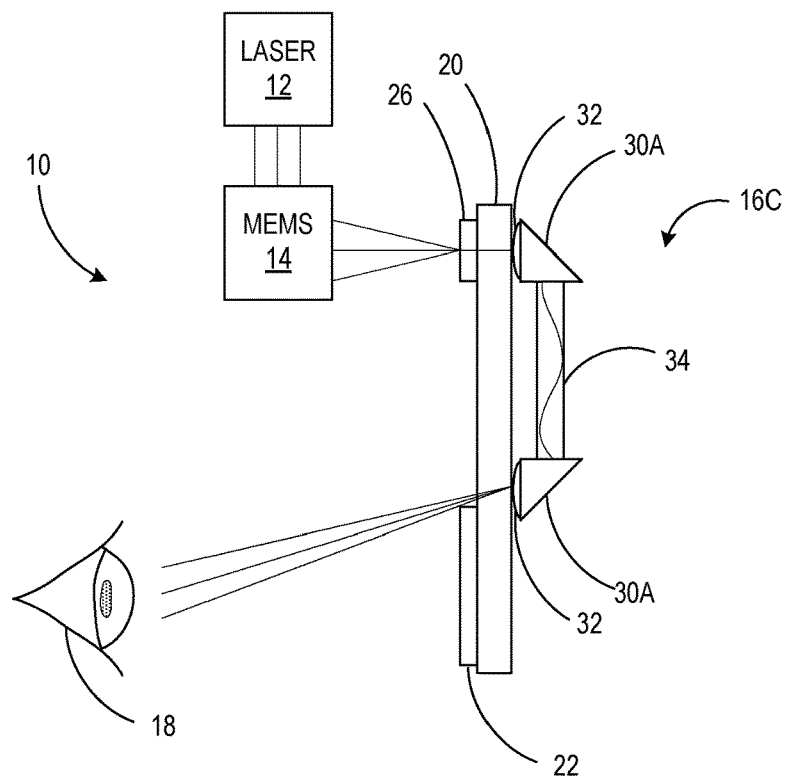
FIG. 5A is a side view of the eye-tracking system of FIG. 2A with a gradient index rod relay.
Figure 5B:
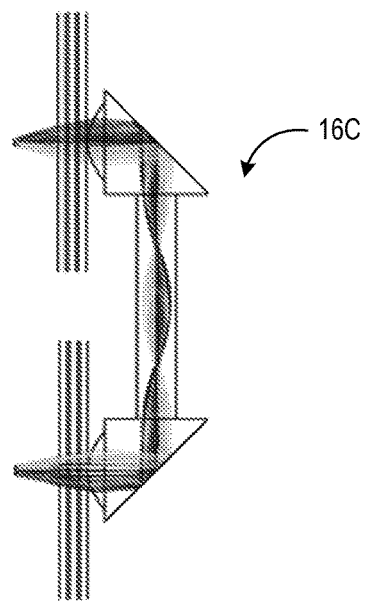
FIG. 5B is a simulation example of the gradient index rod relay of FIG. 5A.

FIG. 5A is a side view of the eye-tracking system 10 with a gradient index rod relay 16C, and FIG. 5B is a simulation example of the relay 16C. The relay 16C may include two prisms 30A connected by a gradient index (GRIN) rod 34. The prisms 30A may have a lens 32 attached to a surface along the IR light path as discussed above, for example, the non-GRIN-rod surface, and may be mounted on the waveguide 20. The GRIN rod 34 may have a gradual variation of its refractive index, shown here as a radial gradient. Accordingly, the light passing through the GRIN rod 34 may be bent into a sinusoidal wave, for example. In addition, to avoid placing the GRIN rod 34 in the user's field of view through the diffractive optical element 22, light may exit the relay 16C along the top edge of the diffractive optical element 22.

Figure 6A:
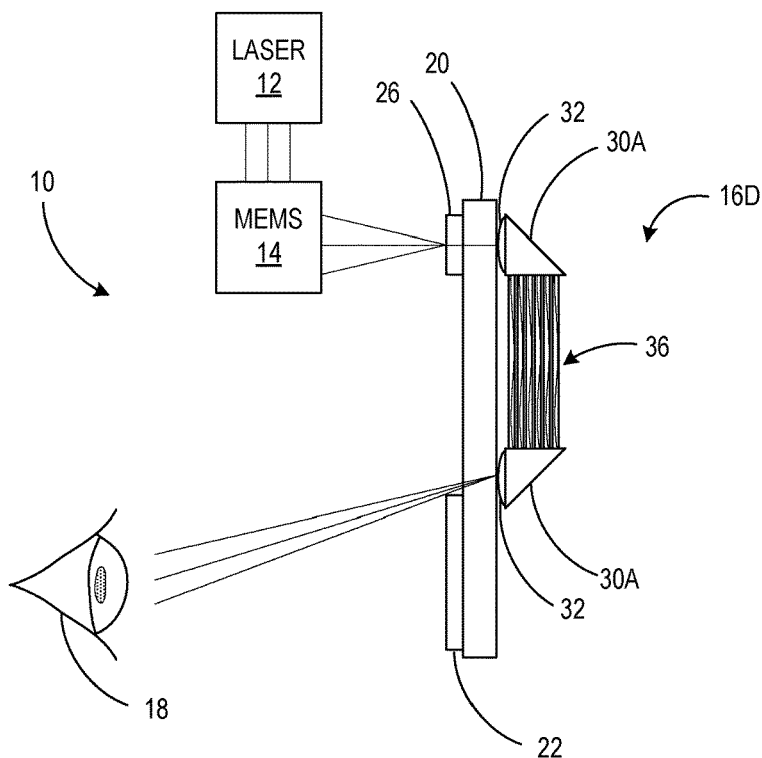
FIG. 6A is a side view of the eye-tracking system of FIG. 2A with a fiber bundle relay.
Figure 6B:
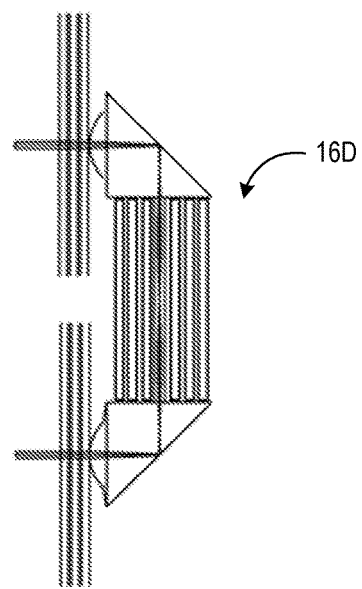
FIG. 6B is a simulation example of the fiber bundle relay of FIG. 6A.

FIG. 6A is a side view of the eye-tracking system 10 with a fiber bundle relay 161), and FIG. 6B is a simulation example of the relay 16D. The relay 16D may include two prisms 30A connected by a fiber bundle 36. The fiber bundle 36 is similar to the GRIN rod 34 in that it conveys light from one prism 30A to the other. However, the fiber bundle 36 is comprised of individual optical fibers that may each be configured to couple light from the MEMS scanning mirror 14 at a single scan angle such that resolution is defined by the number and size of the fibers. Accordingly, the fiber bundle may be flexible enough to bend, allowing for decreased constraints in the physical configuration of components in the eye-tracking system 10.

Figure 7:
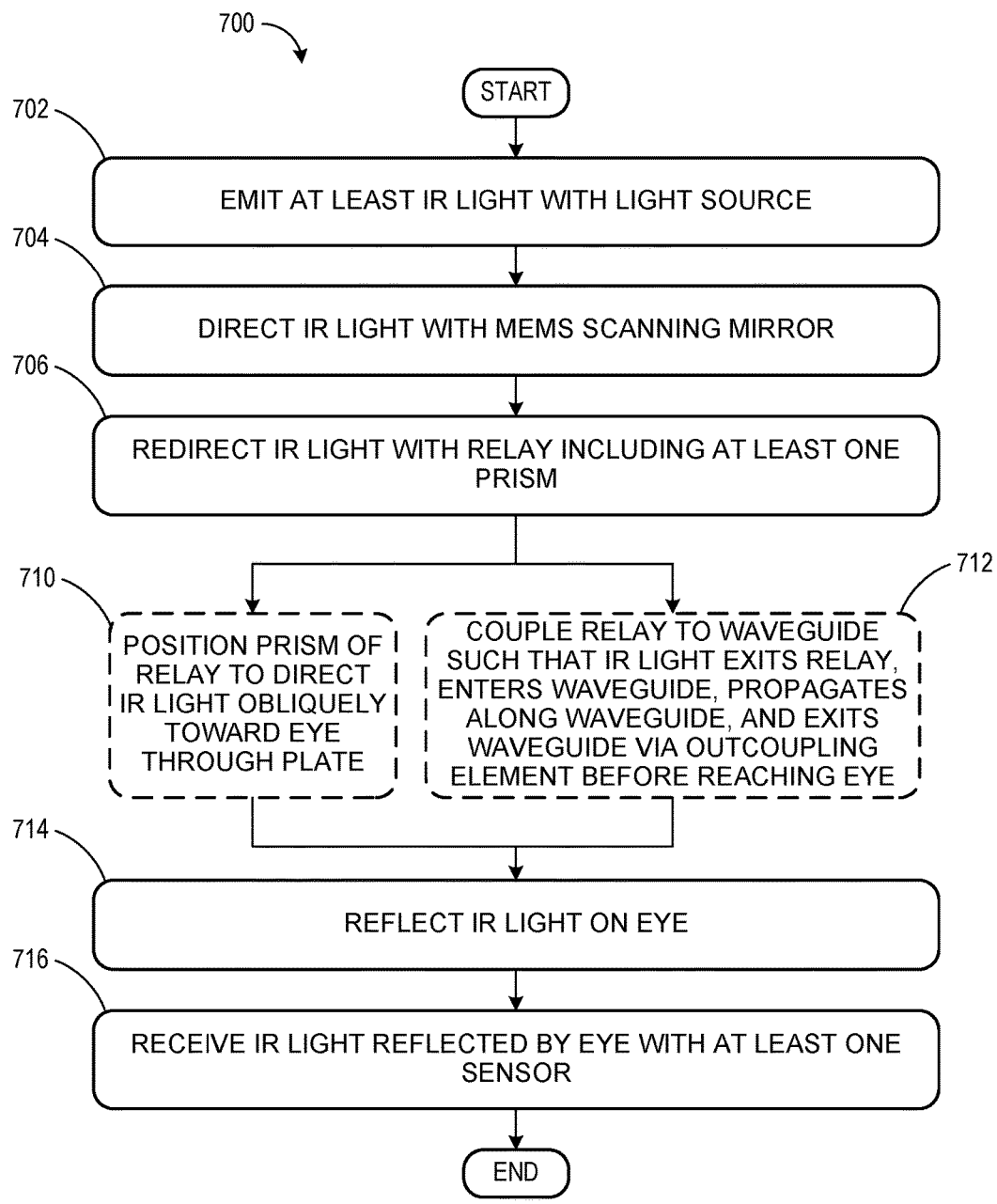
FIG. 7 is a flowchart of a method of sensing an eye with the eye-tracking system of FIG. 2A.

FIG. 7 shows a flowchart of a method 700 of sensing an eye with an eye-tracking system. The following description of method 700 is provided with reference to the eye-tracking systems described above and shown in FIGS. 2A-6B. It will be appreciated that method 700 may also be performed in other contexts using other suitable components.

With reference to FIG. 7, at 702, the method 700 may include emitting at least infrared (IR) light with a light source. As discussed above, the light source (e.g., laser module 12) may also emit visible light for use in a display system. At 704, the method 700 may include directing the IR light with a microelectromechanical system (MEMS) scanning mirror. The MEMS scanning mirror may direct the IR light in a variety of scanning angles over time using one or more micro-mirrors. When the light source also emits visible light for display, the MEMS scanning mirror may direct the visible light together with the IR light. Sharing components between the eye-tracking system and display system in this manner may enable a more compact design for a HMD device including both the eye-tracking system and the display system.

At 706, the method 700 may include redirecting the IR light with a relay including at least one prism. As discussed in detail above, the relay may be formed in a variety of configurations. For example, the relay may include two prisms, each prism having a respective lens; two prisms that are beam splitters; two prisms connected by a gradient index rod; or two prisms connected by a fiber bundle. More or fewer prisms may be incorporated in alternative arrangements. Further, the relay may be connected to a plate, for example, a waveguide. In one example, at 710, this may include positioning a prism of the relay to direct the IR light obliquely toward the eye through the plate. Alternatively, at 712, this may include coupling the relay to the waveguide such that the IR light exits the relay, enters the waveguide, propagates within the waveguide, and exits the waveguide via an outcoupling element before reaching the eye. Consequently, the light may be directed from a substantially on-axis position toward the eye. As used herein. "on-axis" refers to an axis of visible light leaving the diffractive optical element, said axis being perpendicular to the diffractive optical element and directed toward the eye. Furthermore, "on-axis" may include plus or minus 20 degrees of the visible light axis, with a preferred range of plus or minus 5 degrees.

At 714, the method 700 may include reflecting the IR light on the eye, and at 716, receiving the IR light reflected by the eye with at least one sensor. As discussed above, the at least one sensor may be a plurality of IR photodetectors or cameras such as single-pixel photodiodes. The method 700 may be used when gathering sensor data from the at least one sensor. The sensor data may then be analyzed by a processor executing an algorithm, together with data indicating the beam angle of the MEMS scanning mirror at the time each sensor sensed the specular reflected light and diffused scattered light from the eye, in order to determine the position and gaze direction of the eye, and in some cases, reconstruct an image of the iris. In this manner, one point-like light source may be sensed by one of a plurality of small photodetectors to track the position of the user's eye, as opposed to flooding the user's eye with multiple broad light sources and capturing an image of the eye from which features are extracted to track the position of the user's eye. Accordingly, the eye position and gaze direction may be tracked simply and accurately using shared components that are already necessary for displaying images on a display device, rendering the HMD device compact and affordable.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
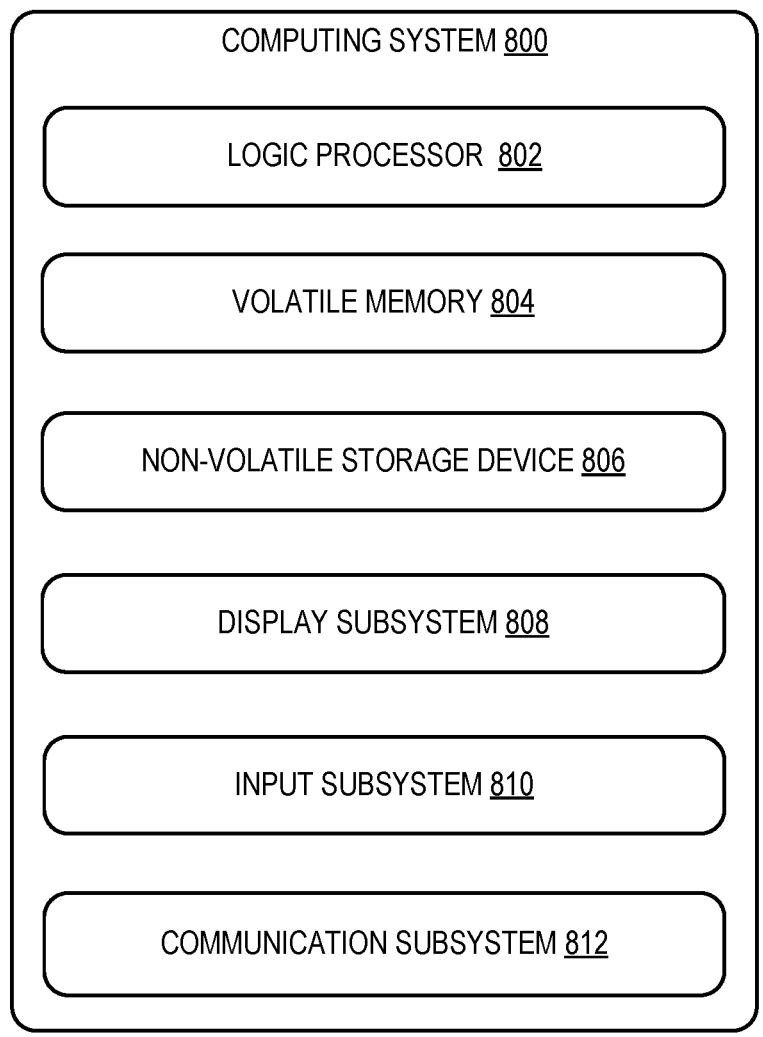
FIG. 8 is an example computing system according to an embodiment of the present description.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. Additionally or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 typically implemented in software by a processor to perform a particular function using portions of volatile memory, which function involves transformative processing that specially configures the processor to perform the function. Thus, a program may be instantiated via logic processor 802 executing instructions held by non-volatile storage device 806, using portions of volatile memory 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 808 may be used to present a visual representation of data held by non-volatile storage device 806. This visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology; however, one utilizing a MEMS scanning mirror to direct laser light may be compatible with the eye-tracking system in a compact manner. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional support for the claims of the subject application. One aspect provides an eye-tracking system comprising a light source configured to emit at least infrared (IR) light, a microelectromechanical system (MEMS) scanning mirror configured to direct the IR light, a relay including at least one prism, the relay configured to receive the IR light directed by the MEMS scanning mirror and redirect the IR light, and at least one sensor configured to receive the IR light after being reflected by an eye. In this aspect, additionally or alternatively, the relay may include two prisms, each prism having a respective lens. In this aspect, additionally or alternatively, the relay may include two prisms that are beam splitters. In this aspect, additionally or alternatively, the relay may include two prisms connected by a gradient index rod. In this aspect, additionally or alternatively, the relay may include two prisms connected by a fiber bundle. In this aspect, additionally or alternatively, a prism of the relay may be positioned to direct the IR light obliquely toward the eye through a plate. In this aspect, additionally or alternatively, the relay may be coupled to a waveguide such that the IR light follows an IR light path that exits the relay, enters the waveguide, propagates within the waveguide, and exits the waveguide via an outcoupling element before reaching the eye. In this aspect, additionally or alternatively, the eye-tracking system may further comprise a waveguide through which the IR light redirected by the relay passes to reach the eye. The light source may be further configured to emit visible light, the MEMS scanning mirror may be further configured to direct the visible light, and the waveguide may be configured to propagate the visible light to be displayed by a diffractive optical element. In this aspect, additionally or alternatively, the eye-tracking system may be included in a head-mounted display device. In this aspect, additionally or alternatively, the at least one sensor may be a plurality of single-pixel photodiodes.

Another aspect provides a method of sensing an eye with an eye-tracking system. The method may comprise emitting at least infrared (IR) light with a light source, directing the IR light with a microelectromechanical system (MEMS) scanning mirror, redirecting the IR light with a relay including at least one prism, reflecting the IR light on the eye, and receiving the IR light reflected by the eye with at least one sensor. In this aspect, additionally or alternatively, the relay includes two prisms, each prism having a respective lens. In this aspect, additionally or alternatively, the relay may include two prisms that are beam splitters. In this aspect, additionally or alternatively, the relay may include two prisms connected by a gradient index rod. In this aspect, additionally or alternatively, the relay may include two prisms connected by a fiber bundle. In this aspect, additionally or alternatively, the method may further comprise positioning a prism of the relay to direct the IR light obliquely toward the eye through a plate. In this aspect, additionally or alternatively, the method may further comprise coupling the relay to a waveguide such that the IR light exits the relay, enters the waveguide, propagates within the waveguide, and exits the waveguide via an outcoupling element before reaching the eye. In this aspect, additionally or alternatively, the at least one sensor may be a plurality of single-pixel photodiodes.

Another aspect provides a head-mounted display (HMD) device with an eye-tracking system. The HMD device may comprise a light source configured to emit visible and infrared (IR) light, a microelectromechanical system (MEMS) scanning mirror configured to direct the visible and IR light, a relay including at least one prism, the relay configured to receive the IR light directed by the MEMS scanning mirror and redirect the IR light, a waveguide through which the IR light redirected by the relay passes to reach an eye, and along which the visible light directed by the MEMS scanning mirror propagates, at least one sensor configured to receive the IR light after being reflected by the eye, and a diffractive optical element configured to display the visible light propagated by the waveguide. In this aspect, additionally or alternatively, the at least one sensor may be a plurality of single-pixel photodiodes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An eye-tracking system, comprising:
a light source configured to emit at least infrared (IR) light;
a microelectromechanical system (MEMS) scanning mirror configured to direct the IR light;
a relay including two prisms, each prism having a respective lens, the relay configured to receive the IR light directed by the MEMS scanning mirror and redirect the IR light; and
at least one sensor configured to receive the IR light after being reflected by an eye.

2. The eye-tracking system of claim 1, wherein one of the prisms of the relay is positioned to direct the IR light obliquely toward the eye through a plate.

3. The eye-tracking system of claim 1, wherein the relay is coupled to a waveguide such that the IR light follows an IR light path that exits the relay, enters the waveguide, propagates within the waveguide, and exits the waveguide via an outcoupling element before reaching the eye.

4. The eye-tracking system of claim 1, further comprising a waveguide through which the IR light redirected by the relay passes to reach the eye, wherein:
the light source is further configured to emit visible light;
the MEMS scanning mirror is further configured to direct the visible light; and
the waveguide is configured to propagate the visible light to be displayed by a diffractive optical element.

5. The eye-tracking system of claim 1, included in a head-mounted display device.

6. The eye-tracking system of claim 1, wherein the at least one sensor is a plurality of single-pixel photodiodes.

7. An eye-tracking system, comprising:
a light source configured to emit at least infrared (IR) light;
a microelectromechanical system (MEMS) scanning mirror configured to direct the IR light;
a relay including two prisms that are beam splitters, the relay configured to receive the IR light directed by the MEMS scanning mirror and redirect the IR light; and
at least one sensor configured to receive the IR light after being reflected by an eye.

8. The eye-tracking system of claim 7, further comprising a waveguide through which the IR light redirected by the relay passes to reach the eye, wherein:
the light source is further configured to emit visible light;
the MEMS scanning mirror is further configured to direct the visible light; and
the waveguide is configured to propagate the visible light to be displayed by a diffractive optical element.

9. An eye-tracking system, comprising:
a light source configured to emit at least infrared (IR) light;
a microelectromechanical system (MEMS) scanning mirror configured to direct the IR light;
a relay including two prisms connected by a gradient index rod, the relay configured to receive the IR light directed by the MEMS scanning mirror and redirect the IR light; and
at least one sensor configured to receive the IR light after being reflected by an eye.

10. The eye-tracking system of claim 9, further comprising a waveguide through which the IR light redirected by the relay passes to reach the eye, wherein:
the light source is further configured to emit visible light;
the MEMS scanning mirror is further configured to direct the visible light; and
the waveguide is configured to propagate the visible light to be displayed by a diffractive optical element.

11. An eye-tracking system, comprising:
a light source configured to emit at least infrared (IR) light;
a microelectromechanical system (MEMS) scanning mirror configured to direct the IR light;
a relay including two prisms connected by a fiber bundle, the relay configured to receive the IR light directed by the MEMS scanning mirror and redirect the IR light; and
at least one sensor configured to receive the IR light after being reflected by an eye.

12. The eye-tracking system of claim 11, further comprising a waveguide through which the IR light redirected by the relay passes to reach the eye, wherein:
the light source is further configured to emit visible light;
the MEMS scanning mirror is further configured to direct the visible light; and
the waveguide is configured to propagate the visible light to be displayed by a diffractive optical element.

13. A method of sensing an eye with an eye-tracking system, the method comprising:
emitting at least infrared (IR) light with a light source;
directing the IR light with a microelectromechanical system (MEMS) scanning mirror;
redirecting the IR light with a relay including two prisms, each prism having a respective lens;
reflecting the IR light on the eye; and
receiving the IR light reflected by the eye with at least one sensor.

14. The method of claim 13, wherein the two prisms are beam splitters.

15. The method of claim 13, wherein the two prisms are connected by a gradient index rod.

16. The method of claim 13, wherein the two prisms are connected by a fiber bundle.

17. The method of claim 13, further comprising positioning one of the prisms of the relay to direct the IR light obliquely toward the eye through a plate.

18. The method of claim 13, further comprising coupling the relay to a waveguide such that the IR light exits the relay, enters the waveguide, propagates within the waveguide, and exits the waveguide via an outcoupling element before reaching the eye.

19. The method of claim 13, wherein the at least one sensor is a plurality of single-pixel photodiodes.

* * * * *